US011847394B2

(12) United States Patent
Coddington et al.

(10) Patent No.: US 11,847,394 B2
(45) Date of Patent: Dec. 19, 2023

(54) SYSTEM AND METHOD FOR USING INTERFACE PROTECTION PARAMETERS

(71) Applicant: Arteris, Inc., Campbell, CA (US)

(72) Inventors: John Coddington, Cedar Park, TX (US); Sylvain Meliciani, Elancourt (FR); Frederic Greus, Epernon (FR); Xavier Van Ruymbeke, Issy les Moulineauz (FR)

(73) Assignee: Arteris, Inc., Campbell, CA (US)

( * ) Notice: Subject to any disclaimer, the term of this patent is extended or adjusted under 35 U.S.C. 154(b) by 88 days.

(21) Appl. No.: 17/540,236

(22) Filed: Dec. 2, 2021

(65) Prior Publication Data

US 2022/0180034 A1 Jun. 9, 2022

Related U.S. Application Data

(63) Continuation of application No. 17/116,242, filed on Dec. 9, 2020, now Pat. No. 11,210,445.

(51) Int. Cl.
*G06F 30/3323* (2020.01)
*G06F 30/32* (2020.01)
(Continued)

(52) U.S. Cl.
CPC ......... *G06F 30/3323* (2020.01); *G06F 30/32* (2020.01); *G06F 30/337* (2020.01); *G06F 2119/02* (2020.01)

(58) Field of Classification Search
CPC .... G06F 30/3323; G06F 30/32; G06F 30/337; G06F 2119/02
(Continued)

(56) References Cited

U.S. PATENT DOCUMENTS 7,460,984 B1 * 12/2008 Clark .................. G06F 30/3312
703/2
8,131,528 B1 * 3/2012 Vora ....................... G06F 30/20
703/19
(Continued)

FOREIGN PATENT DOCUMENTS

CN 113946483 A 1/2022

OTHER PUBLICATIONS

Sharp, "High-Level Hardware Synthesis", University of Cambridge, 2002, 213 pages. (Year: 2002).*
(Continued)

*Primary Examiner* — Phallaka Kik
(74) *Attorney, Agent, or Firm* — Dana Legal Services; Jubin Dana (57) ABSTRACT

A system and method for adding interface protection to an electronic design using parameters. The electronic design and interface protection scheme are defined as parameters. An interface protection model creates interface protection implementation parameters that describe the implementation details of the interface protection. A hardware description model uses the electronic design parameters and the interface protection implementation parameters to create a hardware description. The interface protection scheme can be a built-in protection scheme, a user defined scheme, a scheme that includes place holders that the user may define later, and a combination of the preceding. The interface protection scheme may contain components to help with the retiming of the description of hardware.

12 Claims, 8 Drawing Sheets

(51) Int. Cl.
*G06F 30/337* (2020.01)
*G06F 119/02* (2020.01)

(58) Field of Classification Search
USPC .......................... 716/100, 103, 104; 703/14
See application file for complete search history.

(56) References Cited

U.S. PATENT DOCUMENTS

| | | | |
|---|---|---|---|
| 10,956,637 B2 * | 3/2021 | ElSharif | G06F 30/327 |
| 11,042,675 B2 | 6/2021 | Feng et al. | |
| 11,210,445 B1 * | 12/2021 | Coddington | G06F 30/327 |
| 2010/0005433 A1 * | 1/2010 | Umezawa | G06F 30/327 |
| | | | 716/106 |
| 2019/0370420 A1 * | 12/2019 | Feng | G06F 30/20 |
| 2021/0312110 A1 * | 10/2021 | Feng | G06F 30/20 |

OTHER PUBLICATIONS

"IEEE Standard for Verilog Hardware Description Language", IEEE Computer Society, 2005, 590 pages. (Year: 2005).
Ajilesh et al: "Design of Configurable IP Core for Error Detection and Correction", International Journal of Computer Science and Informatics, Jan. 1, 2014 (Jan. 1, 2014), pp. 198-201, XP055914547, DOI: 10.47893/IJCSI.2014.1144 *abstract* * p. 198-p. 200 *.
Daniele Rossi et al: "Configurable Error Control Scheme for NoC Signal Integrity", On-Line Testing Symposium, 2007. IOLTS 07. 13th IEEE International, IEEE, PI, Jul. 1, 2007 (Jul. 1, 2007), pp. 43-48, XP031117822, ISBN: 978-0-7695-2918-9 *abstract* * p. 43-p. 44 * * p. 46-p. 48 *.

* cited by examiner

SYSTEM AND METHOD FOR USING INTERFACE PROTECTION PARAMETERS

CROSS REFERENCE TO RELATED APPLICATIONS

This application is a continuation of U.S. Non-Provisional application Ser. No. 17/116,242, which was filed on Dec. 9, 2020 and entitled SYSTEM AND METHOD FOR INTERFACE PROTECTION by John CODDINGTON et al., the entire disclosures of which are incorporated herein by reference.

FIELD OF THE INVENTION

The present technology is in the field of computer system design and, more specifically, related to a protection scheme for interfaces in synthesis of the topology of a network-on-chip (NoC).

BACKGROUND

As electronics become more critical for safety and reliability, e.g., autonomous driving, there is an increasing need to verify the connected components are functional and communicating. This communication can occur across any electronic component. For example, communication may occur between components within an integrated circuit (IC), between IC chips, between circuit boards, between electronic devices, and any combination of the preceding.

Multiprocessor systems implemented in systems-on-chips (SoCs) communicate through networks, such as a network-on-chip (NoC). Intellectual Property (IP) blocks or elements or cores are used in chip design. The SoCs include instances of intellectual property (IP) blocks. Some IP blocks are masters. Some IP blocks are slaves. Masters and slaves communicate through a network, such as a NoC.

Verifying communication is typically done within software, firmware, or hardware. Some downsides of verifying communication in the software and/or firmware may include creating and maintaining code for each interface type, wasted bandwidth of the processor running this code, and lag time between when an error occurs and when the system receives the error due to the time taken to execute the error checking code. Verifying the communication in hardware may have advantages when compared to software and/or firmware, e.g., decreased processor loading, lower power, and improved response times.

A challenge to creating custom hardware communication verification is ensuring compatibility between components. An IC design team must keep the communication verification compatible between their circuit blocks and the challenge grows exponentially when using intellectual property (IP) blocks from external IP vendors. A similar problem is faced when dealing with an external interface, e.g., interfacing with another IC chip. The compatibility problem is being made more difficult due to more functionality being added to IC chips, e.g., System on Chip (SoC). Additionally, when IC designers write the communication verification component manually, the design time of the IC increases thus adding to the cost of the IC, and this manual process also increases the potential of inadvertently adding engineering errors, e.g., bugs. Additionally, to comply with certain standards, the interface must verify connectivity, e.g., IS026262. Therefore, what is needed is a system and a method that modifies an electronic design in such a way as to add verification that the components are functioning and communicating.

SUMMARY OF THE INVENTION

A system and a method are disclosed that modifies an electronic design in such a way as to add verification that the components are functioning and communicating. In accordance with one aspect and embodiment of the invention, the verification that the components are functioning and communicating may include adding parameters that enable hardware validation at the component interfaces. Adding the hardware validation may involve any combination of adding components, removing components, adding signals, removing signals, re-routing signals, and any other valid modification to the hardware description. It is noted that a person of skill in the art at the time of this applications filing would understand that if two components are communicating properly then the components are at least functional in respect to their interface.

In accordance with one aspect and embodiment of the invention, the invention may receive system parameters that include electronic design parameters and interface protection parameters. Using built in libraries and the system parameters, the invention may create a model for adding the verification logic. After model creation, the interface protection implementation parameters may be created by the model. Using the system parameters, the hardware description with validation may be created and added to the system parameters. The invention may output the hardware description with validation, e.g., output register transfer logic (RTL) code. In accordance with another aspect and embodiment of the invention, the invention may evaluate the hardware description with verification, and if the hardware description does not meet one or more requirements, then the parameters may be adjusted which in turn may cause the model to be updated and the hardware description to be created again.

In accordance with one aspect and embodiment of the invention, the hardware description with validation may include a notification that a fault has occurred in the communication. In accordance with another aspect and embodiment of the invention, when the validation scheme contains enough information to correct erroneous data then the verification hardware may correct the data.

In accordance with one aspect and embodiment of the invention, instead of using an internal library for model creation, the user may specify the library to use in model creation. Additionally, or alternatively, the user may specify placeholders in the configuration that can be defined later in the user's design flow.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

A way to ensure components are functional and communicating is to add interface protection. Interface protection may include generators and checkers that implement protection using any kind of redundancy scheme such as parity, error-correcting code (ECC), cyclic redundancy checks (CRC), and any other scheme that is capable of ensuring components are functional and communicating. An advantage of using interface protection at the hardware level may be that the software can treat all the interfaces the same without knowing the interface protection implementation details.

An interface between electronic components may be any combination of internal (e.g., interface between sub-blocks contained within the electronic design hierarchy) and external (e.g., ARM AMBA protocols, OCP-IP, etc.). The external interface may be to another component within the IC chip, to another IC chip, to a circuit board, to another electronic device, or any other component capable of communicating with the interface. When interfacing with an external interface, the external interface may be required to implement the interface protection. Interface protection can be implemented on any pin type, e.g., input pin, output pin, bidirectional pin, and any other type of interface pin. The interface protection scheme may include encoded signals, e.g., for secure communication between electronic components.

The terms "signal path," "path," and "route" are used interchangeable herein. Paths includes and are made up of any combination of end points and edges (edges are also referred to herein as links), along which a transaction in the form or a signal or data travels form source to destination (sink or target).

As used herein, a "master," an "initiator," and "source" refer to similar intellectual property (IP) blocks, units, or modules. The terms "master" and "initiator" and "source" are used interchangeably within the scope and embodiments of the invention. As used herein, a "slave," a "target," and "sink" refer to similar IP blocks; the terms "slave" and "target" and "sink" are used interchangeably within the scope and embodiments of the invention. As used herein, a transaction may be a request transaction or a response transaction. Examples of request transactions include write request and read request.

Figure 1:
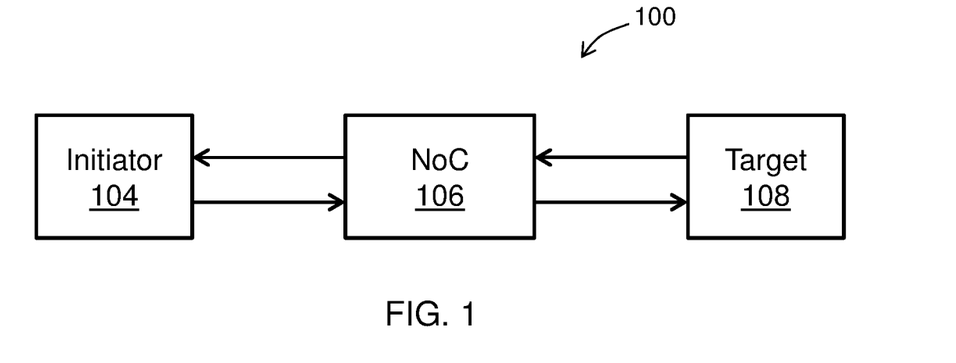
FIG. 1 shows a system having an initiator, a network-on-chip (NoC), and a target in accordance with the various aspects and embodiments of the invention.

Referring now to FIG. 1, a system 100 is shown having an initiator 104 that is connected to the network-on-chip (NoC) 106 with a path that carries signals. The initiator 104 communicates with a target 108 through the NoC 06. The target 108 is connected to the NoC 106 with a path that carries signals.

Figure 2:
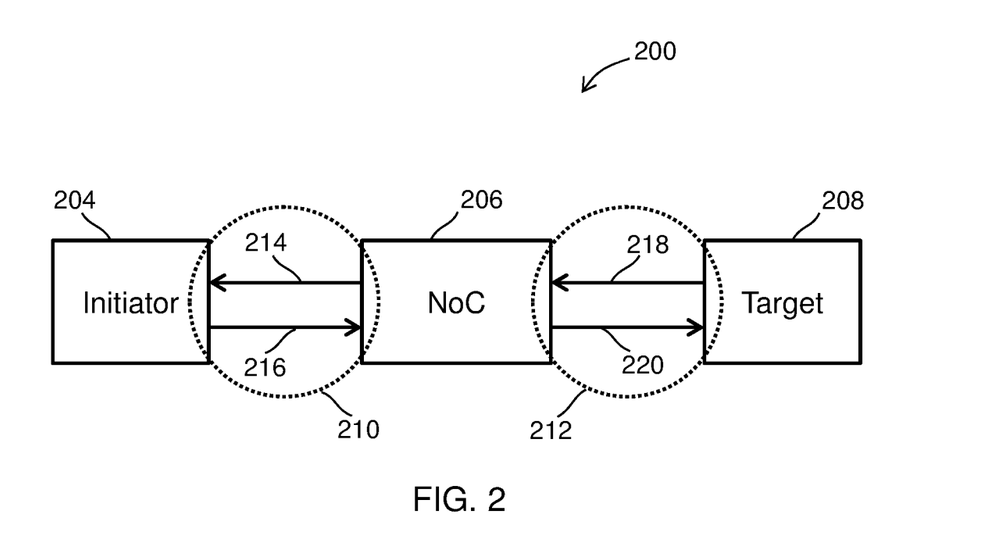
FIG. 2 shows the system of FIG. 1 with interface protection in accordance with the various aspects and embodiments of the invention.

Referring now to FIG. 2, a system 200 is shown according to one or more embodiments and aspects of the invention. An initiator 204 and a target 208 communicate using a network-on-chip (NoC) 206. The system 200 includes an interface 210 between the initiator 204 to the NoC 206. The system 200 includes an interface 212 between the target 208 to the NoC 206. For example, initiator 204 begins communication with NoC 206 by generating and transmitting a request (transaction) via signal path or path 216. NoC 206 routes the request through internal circuitry and sends the request to target 208 via signal path 220. After target 208 processes the request, target 208 generates and transmits a response via signal path 218 to NoC 206. NoC 206 routes the response through internal circuitry and sends the response to initiator 206 via signal path 214.

When a request is sent from the initiator 204 to the target 208, this may be referred to as the forward direction. When a return response is sent from the target 208 to the initiator 204, this may be referred to as the backward direction. When referring to communication, it is understood to be forward and backward communication, unless specifically stated that the communication is either one way or bidirectional.

Figure 3A:
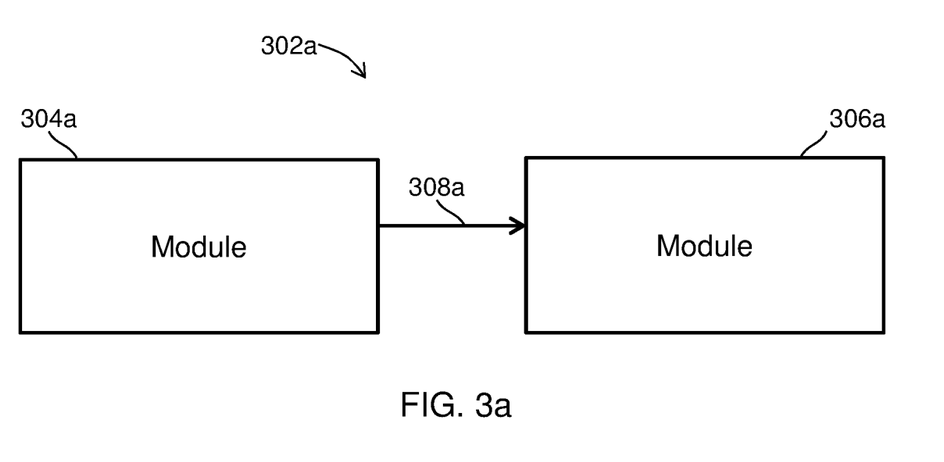
FIG. 3a shows a system with two IP blocks or modules connected by a path.

Referring to FIG. 3a, a system 302a is shown with module 304a and module 306a being connected by signal path 308a, which is a system before the interface protection is added. According to an embodiment and aspect of the invention, the signal path 308a is a uni-directional signal going from module 304a to module 306a. According to one or more embodiments and aspects of the invention, the signal path 308a may be any type of signal, e.g., bi-directional, serial, multi-bit, analog, digital, mixed-signal, continuous, discrete, duplexed, etc. According to one or more embodiments and aspects of the invention, system 302a may be described using parameters, e.g., components, connectivity, and any other information that may describe an electronic design that is relevant to module 304a and module 306a.

According to one or more embodiments and aspects of the invention, interface protection may be specified for system 302a by defining a set of parameters that describes how to implement interface protection for signal path 308a. For example, parameters may include protection_type=Parity and signals=All. According to one or more embodiments and aspects of the invention, a protection generator and checker model may be created, and the model may be used to create interface protection implementation parameters.

Figure 3B:
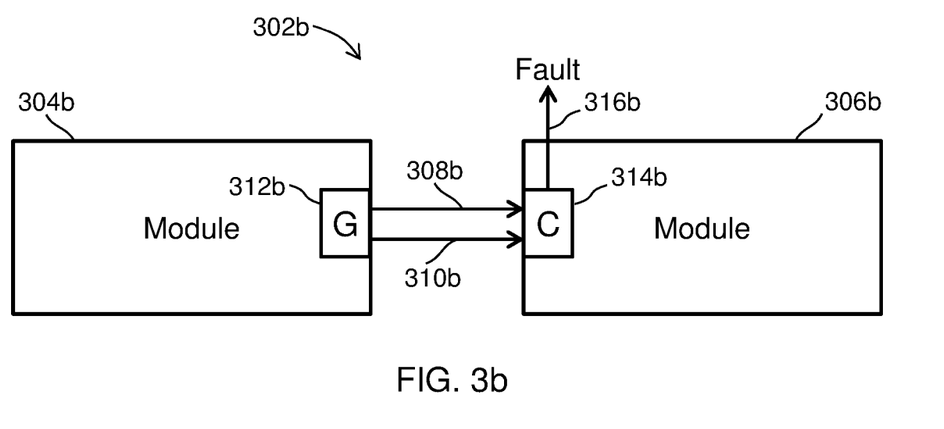
FIG. 3b shows the system of FIG. 3a with a protection path in accordance with the various aspects and embodiments of the invention.

According to one or more embodiments and aspects of the invention and as shown in FIG. 3b, by applying protection generator and checker model along with system parameters to system 302a, system 302b with interface protection is created. System 302b includes module 304b, module 306b, signal path 308b, protection signal path 310b, generator 312b, checker 314b, and fault signal path 316b. According to the present embodiment and aspect of the invention, when interface protection is added to system 302a for signal path 308a, at least the following modifications are performed:

Module 304b is created by adding generator 312b to module 304a, creating signal 308b by re-routing signal path 308a through generator 312b, and creating protection signal path 310b;

Module 306b is created by adding checker 314b to module 306a, re-routing signal path 308a through checker 314b, creating protection signal path 310b, and creating fault signal path 316b; and Routing protection signal path 310b between module 304b and module 306b.

Generator 312b monitors signal on path 308b to create protection signal on path 310b. Checker 314b monitors signal on path 308b and protection signal on path 310b to determine if a fault has occurred. A fault may be a permanent or transient corruption of one or more signals of the interface between module 304b and module 306b. In accordance with various aspects and embodiments of the invention, a fault is indicated using a fault signal on path 316b. Generator 312b and checker 314b may implement interface protection using any kind of redundancy scheme, e.g., parity, ECC, CRC, etc.

In accordance with an aspect and embodiment of the invention, checker 314b may include a correctable fault signal path to indicate a fault may be corrected. At the system level, a large number of correctable errors may be indicative of a higher probability of undetectable errors and the appropriate response may be performed, e.g., shutting down the system.

The generator 312b and checker 314b redundancy scheme can use any number of checking bit lines and/or could be encoded within the signal to be checked. For example, system 302b may use a parity protection scheme where protection signal path 310b is a parity bit of signal path 308b. For example, system 302b may be output as RTL code.

Figure 4A:
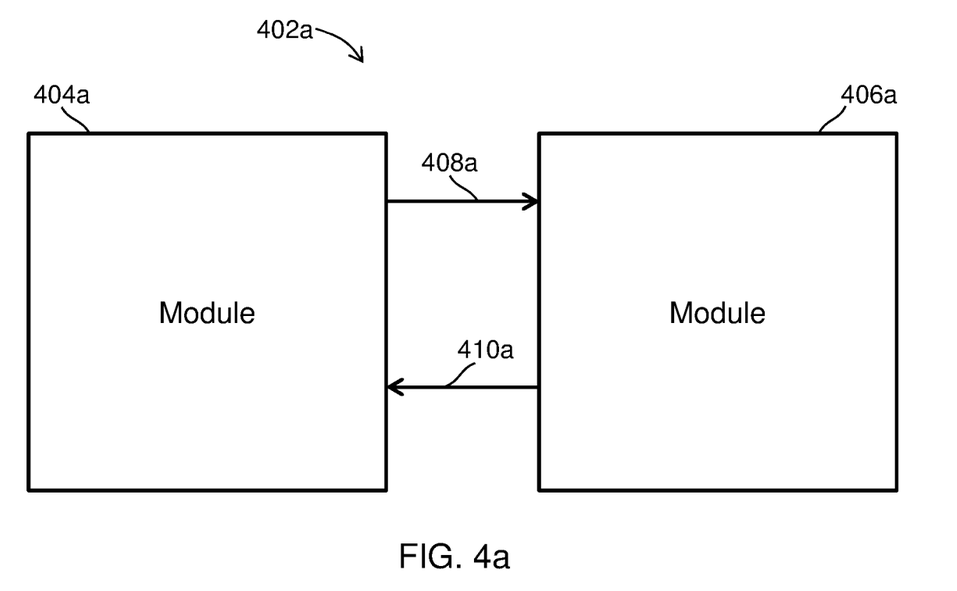
FIG. 4a shows a system with two IP blocks or modules connected by a forward path and a backward path.

Referring to FIG. 4a, a system 402a is shown with module 404a and module 406a being connected by path 408a and path 410a, which is a system before the interface protection is added. According to some embodiments and aspects of the invention, path 408a is a uni-directional and signal goes from module 404a to module 406a. Path 410a is a uni-directional path with signals going from module 406a to 404s. According to one or more embodiments and aspects of the invention, signals on path 408a and path 410b may be any type of signal, e.g., bi-directional, serial, multi-bit, analog, digital, mixed-signal, continuous, discrete, etc. According to one or more embodiments and aspects of the invention, system 402a may be described using parameters, e.g., instances, connectivity, and any other information that may describe an electronic design. According to one or more embodiments and aspects of the invention, system 402a may have the same or similar functionality as system 302a, and system 402a may include the additional signal path 410a that has the same or similar functionality as signal path 408a except for the direction of signal flow.

According to one or more embodiments and aspects of the invention, interface protection may be specified for system 402a by defining a set of parameters that describes how to implement interface protection for path 408a. For example, parameters may include protection_type=Parity and signals=All. According to one or more embodiments and aspects of the invention, a protection generator and checker model may be created, and the model may be used to create interface protection implementation parameters.

Figure 4B:
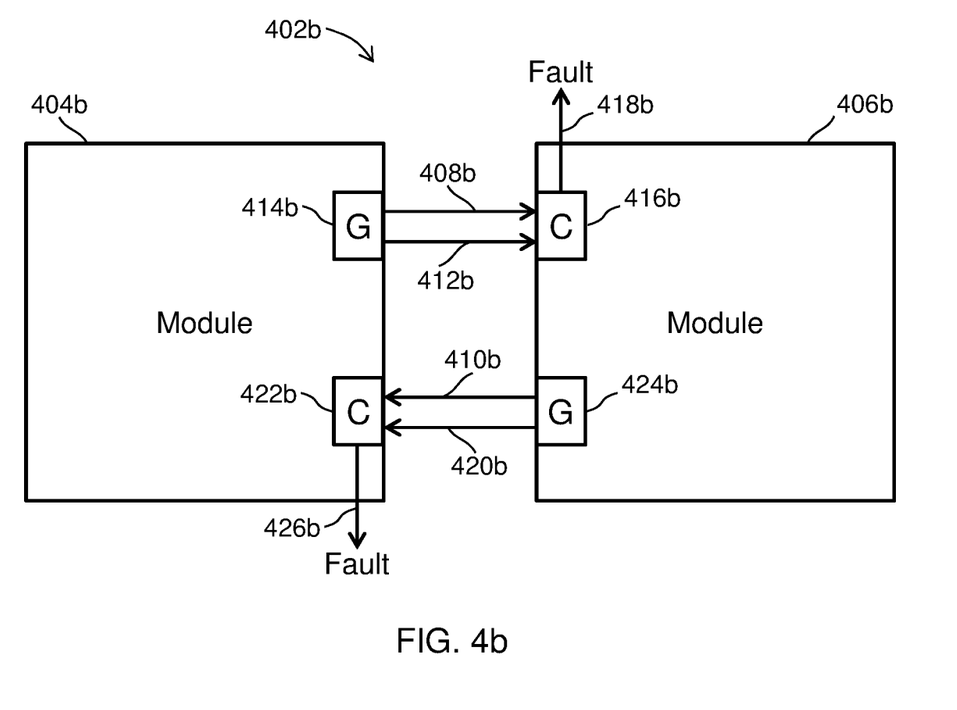
FIG. 4b shows the system of FIG. 4a with a forward direction protection path and a backward direction protection path in accordance with the various aspects and embodiments of the invention.

According to one or more embodiments and aspects of the invention and as shown in FIG. 4b, a system 402b includes protection generator and checker model along with system parameters applied. The system 402b includes interface protection. System 402b includes module 404b, module 406b, path 408b, path 410b, protection path 412b, generator 414b, checker 416b, fault path 418b, protection path 420b, checker 422b, generator 424b, and fault path 426b. Additionally, checker 416b and/or checker 422b may include a correctable fault signal path to indicate a fault may be corrected. According to one or more embodiments and aspects of the invention, adding interface protection to path 408b and path 410b may be done in the same or similar manner as path 308a. For example, system 402b may be output as RTL code.

According to one or more embodiments and aspects of the invention, interface protection can be added followed by evaluating the interface protection implementation. If the interface protection implementation does not meet a desired specification, then the system parameters can be adjusted and the adding interface protection algorithm can be repeated. This concept is described in greater detail later in reference to FIG. 6. For example, with interface protection included in system 402b, the electrical design is exported as RTL. If a synthesis and place and route (P&R) tool finds the electronic design does not meet specification (e.g., could not close timing), then the system parameters for creating interface protection can be adjusted; the process may be repeated until the specification is met or a point is reached where no further improvement is possible. Iteratively adjusting system parameters may involve an automated parameter adjustment algorithm, the user interactively adjusting parameters, any other way of adjusting parameters, and any combination of the aforementioned.

Figure 5:
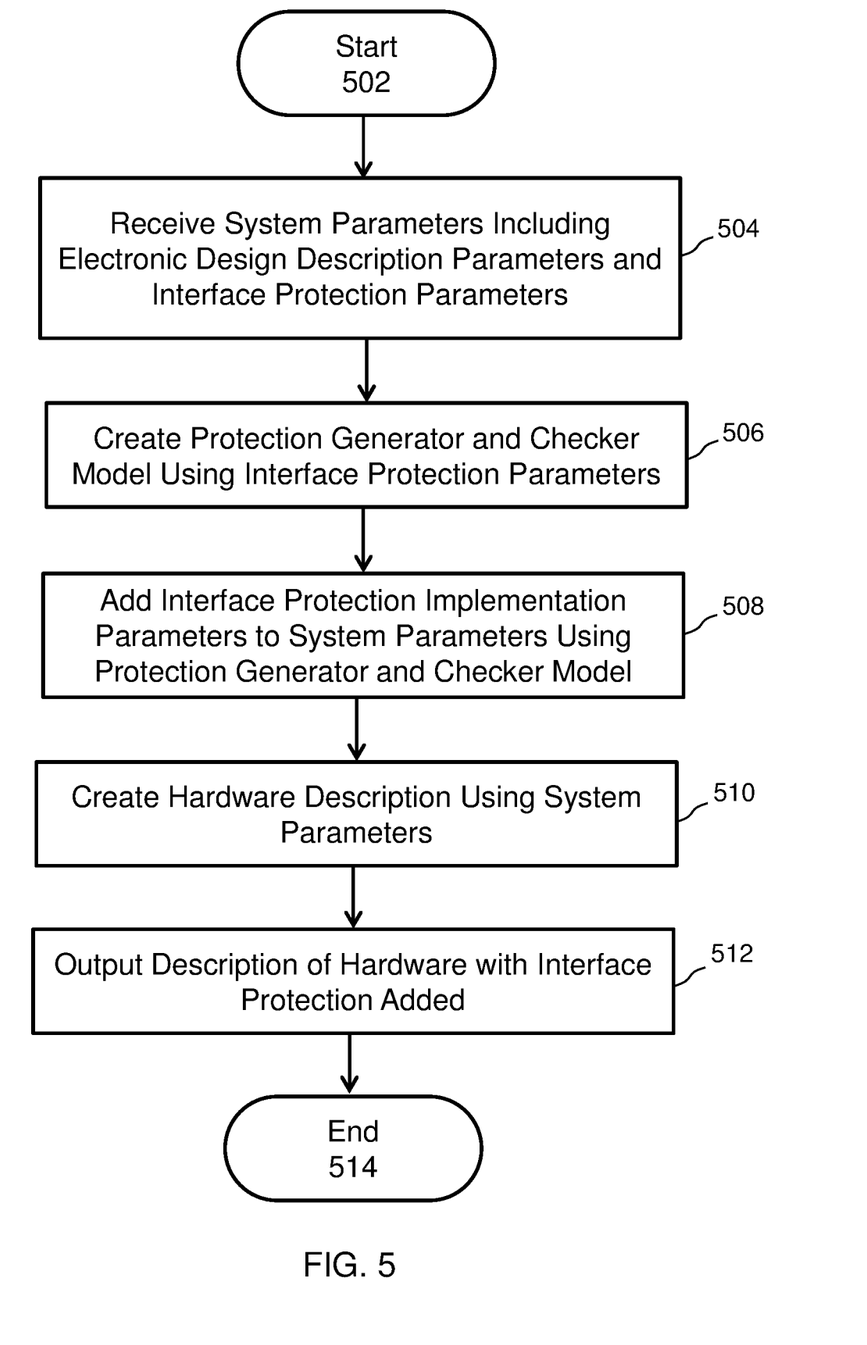
FIG. 5 shows an interface protection process using parameters to create a hardware description, in accordance with the various aspects and embodiments of the invention.

Referring to FIG. 5, an interface protection process is started with step 502. In accordance with some embodiments and aspects of the invention, an interface protection process described in FIG. 5 uses parameters to create a hardware description that includes interface protection. The interface protection process may be started by user input, by a scheduled time occurring, another task completing, a milestone event occurring in the electronic design, any other event capable of starting an interface protection process, and any combination of the aforementioned.

At step 504, system parameters are received, which include electronic design description parameters and interface protection parameters. The system parameters may be converted to an internal representation or other format, and the converted system parameters may be used for the remaining steps. Electronic design description parameters describe an electronic design that interface protection will be added. The electronic design description parameters may be a high-level description of the electronic design, e.g., SystemC, equations, and any other way to describe an electronic design that may be converted to a hardware design. The electronic design description parameters may include components, component parameters, component connectivity, electronic design interfaces (e.g., internal and external interfaces), and interface parameters. The electronic design description parameters may be hierarchical, e.g., contain sub-blocks.

In one or more embodiments and aspects, the electronic design description parameters include a hardware description, e.g., hardware function, Hardware Description Language (HDL), Verilog, VHDL, System Verilog, Register Transfer Level (RTL), OpenAccess database, Library Exchange Format and Design Exchange Format (LEF/DEF), netlist, proprietary formats (e.g., vendor developed, customer developed, etc.), and any other structure that describes hardware. For example, system 302a, shown in FIG. 3a, may be described using electronic design description parameters.

Interface protection parameters describe the interface protection scheme, e.g., signals to protect (e.g., any number of configurable signals in the forward and/or reverse direction), protection type, interfaces to protect, user defined protection scheme, and any other parameter needed to define an interface protection scheme. Interface protection parameters may be received from user input, project settings, previous settings, a default template, rules based on previous usage, and any other source capable of sending parameters. Interface protection parameters may specify the name of a built-in protection scheme. For example, the protection type may be "parity", in which case the built-in library can be used to modify the electronic design by adding a parity bit in the same direction as the interface signal. The interface protection parameters may allow the user to define their own protection scheme, in which case interface protection parameters contain all the necessary parameters to create the interface protection scheme. For example, the user may specify interface protection parameters as interface signals, a logic equation processing these signals, and a set of resulting protection signals. Interface protection parameters may include a description of the relationship between protection signals and interface signals. Interface protection parameters may allow configuration where the interface protection creates the protection signals and creates empty placeholders blocks that the user may define later in their design flow. Interface protection parameters may allow a built-in model to be used along with the user overwriting the model at least partially.

At step 506, a protection generator and checker model are created using the interface protection parameters. When the interface protection parameters are configured to use a built-in protection scheme, the protection generator and checker model may be created from a built-in protection scheme library and any parameters required to create the model. The interface protection parameters may specify that a built-in protection scheme library model be used as the base and certain parts of the model overwritten as defined in the interface protection parameters. When the interface protection parameters specify a user defined protection scheme, the protection generator and checker model may be created using the interface protection parameters.

When the interface protection parameters specify a protection scheme where placeholders are to be created, a protection generator and checker model may be created such that the generator and checker model is configured to create the user defined placeholders for certain blocks. The protection generator and checker model may include the electronic design description parameters. The protection generator and checker model may include logic equations that define protection signals, protection blocks, and interface modifications. The protection generator and checker model may determine a signal is valid based on the value of one or more other signals. The protection generator and checker model may include retiming stages to aid in meeting design specification, e.g., closing timing.

At step 508, interface protection implementation parameters are added to the system parameters using the protection generator and checker model. The protection generator and checker model are configured to make any changes necessary to add interface protection to the electrical design via interface protection implementation parameters. The interface protection implementation parameters provide the necessary information to create a hardware description of the electronic design with interface protection added. The protection generator and checker model may create interface protection implementation parameters that describe any edit to the electronic design, e.g., add components, remove components, modify components, add signals, remove signals, re-route signals, etc. When the interface protection allows an interface to auto-correct an error (e.g., ECC), the interface protection implementation parameters may include the necessary parameters to enable auto-correction, e.g., add a correction component.

The protection generator and checker model may operate on any hierarchical level of the electronic design, e.g., interfaces between sub-components within an electronic design. For example, when the user selects to use the built-in parameter model and the electronic design description parameters describe the design shown in FIG. 3a, the protection generator and checker model may add interface protection implementation parameters to the system capable of describing the electronic design shown in FIG. 3b. The interface protection scheme may include any combination of interface protection schemes and/or no protection for certain signals. For example, for an interface with multi-bit signals a, b, c, d, e, and f then parity interface protection may be applied to signals a[31:16], b[10:2], c[1:0], ECC interface protection applied to signals a[15:0], b[1:0], c[13:2], and no interface protection applied to signals d, e and f.

At step 510, a hardware description is created using system parameters. According to one or more embodiments and aspects of the invention, using the electronic design description parameters and interface protection implementation parameters, a hardware description is created. A notification that the hardware description has been at least partially created may be sent. The notification can be generated when the hardware description has been completed.

At step 512, the hardware description, which includes interface protection, is outputted. The hardware can be outputted in any format that can describe hardware, e.g., hardware function, Hardware Description Language (HDL), Verilog, VHDL, System Verilog, Register Transfer Level (RTL), OpenAccess database, Library Exchange Format and Design Exchange Format (LEF/DEF), netlist, proprietary formats (e.g., vendor developed, customer developed, etc.), and any other structure that describes hardware. According to one or more embodiments, the hardware description is output as RTL. The process ends at step 514.

Figure 6:
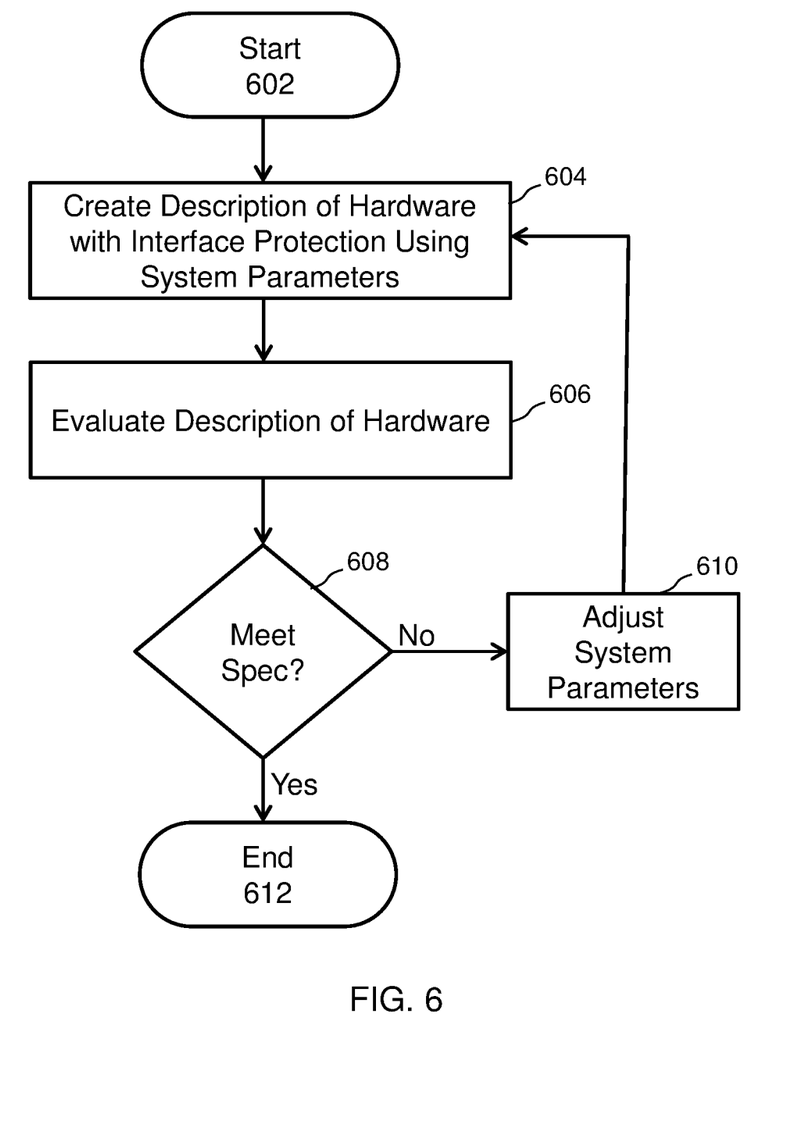
FIG. 6 shows an interface protection optimization, in accordance with the various aspects and embodiments of the invention.

Referring to FIG. 6, an interface protection optimization process is started with step 602. In accordance with some embodiments and aspects of the invention, an interface protection process described in FIG. 6 uses parameters to create a hardware description that includes interface protection and iterates over the design in an optimization loop.

The interface protection optimization process may be started by user input, by a scheduled time occurring, another task completing, a milestone event occurring in the electronic design, any other event capable of starting an interface protection optimization process, and any combination of the aforementioned.

At step 604, a hardware description is created with interface protection using system parameters. According to one or more embodiments and aspects of the invention, step 604 may perform the same or similar function as step 502 through step 514.

At step 606, the hardware description is evaluated to determine the evaluation metric or evaluation parameter. Any evaluation metric may be used to evaluate the hardware description. For example, the hardware description may be simulated to determine the evaluation metric. For example, the hardware description may be sent through a synthesis tool followed by place and route, and the state of timing closure may be the evaluation metric. The evaluation metric may be multi-dimensional. For example, the evaluation metric for a circuit may be the area needed for the circuit and the power the circuit consumes.

At step 608, the specification is compared to the evaluation metric to determine if the specification is met. If the specification is met, step 612 is performed which completes the optimization process. If the specification is not met, step 610 is executed. For example, if after the hardware description is synthesized and place and routed, the timing is not closed then the specification is not met and step 610 is performed.

At step 610, the system parameters are adjusted to optimize the design and/or meet the specification. Optimizing may mean an incremental improvement (e.g., local minimum), finding a global optimization (e.g., global minimum), and any other meaning known to a person of skill in the art at the time of filing of the present application. The parameters adjustment may involve changing system parameters, deleting system parameters and/or adding system parameters. For example, parameters to include retiming stages may be added to the system parameters. After step 610 is completed, step 604 is performed with the adjusted system parameters.

Figure 7:
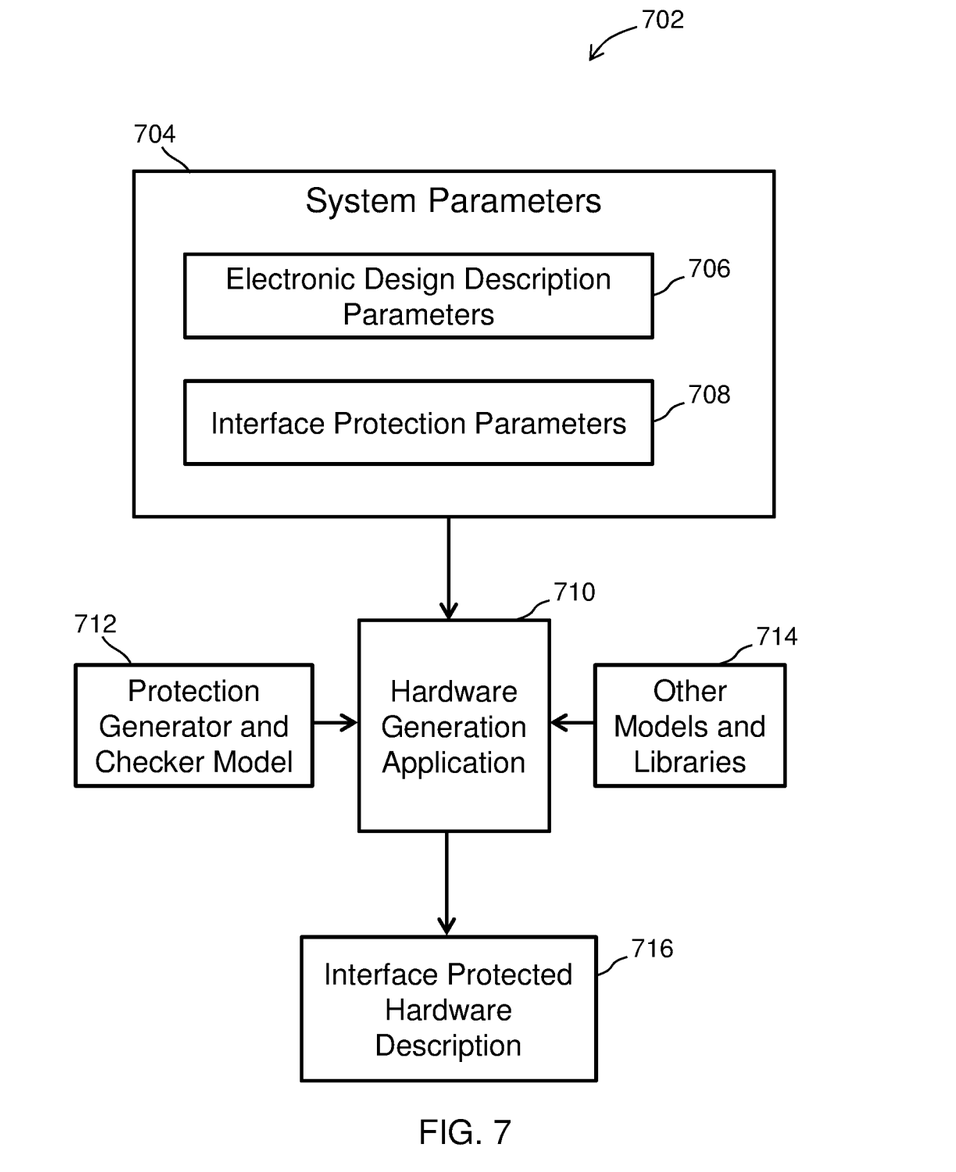
FIG. 7 shows a system for creating interface protected hardware description, in accordance with the various aspects and embodiments of the invention.

Referring to FIG. 7, in accordance with some embodiments and aspects of the invention, a system 702 is shown where system parameters 704, protection generator and checker model 712, and other model and libraries 714 are used by hardware generation application 710 to create interface protected hardware description 716. System parameters 704 include electronic design description parameters 706 and interface protection parameters 708. System parameters 704 may be the same or similar system parameters received in step 504 of FIG. 5. The electronic design description parameters 706 describe the electronic design that interface protection will be added. Interface protection parameters 708 parameters describe the interface protection scheme. The protection generator and checker model 712 creates interface protection implementation parameters that is used to at least partially create the hardware design. The protection generator and checker model 712 may be the same or similar to protection generator and checker model of step 506 of FIG. 5.

The other model and libraries 714 include models and libraries needed at least partially by hardware generation application 710 to create the interface protected hardware description 716. Non-limiting examples of other model and libraries 714 may include library of interface models and library of hardware components models. The hardware generation application 710 creates interface protected hardware description 716 using system parameters 704, protection generator and checker model 712, and other model and libraries 714. The interface protected hardware description 716 may be the same or similar as the hardware description created in step 512 of FIG. 5.

Figure 8A:
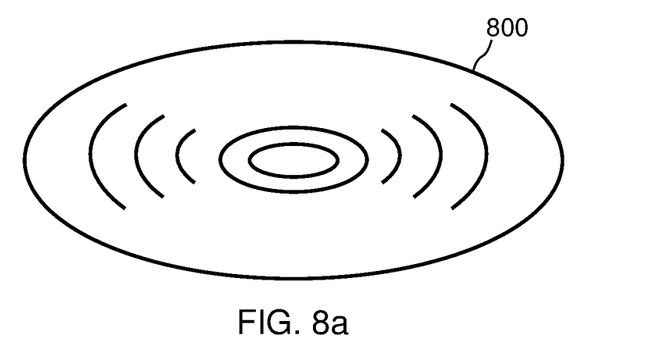
FIG. 8a illustrates a rotating disk non-transitory computer readable medium, according to an embodiment of the invention.

Referring now to FIG. 8*a*, shown is a non-transitory computer readable rotating disk medium 800 that stores computer code that, if executed by a computer processor, would cause the computer processor to perform methods or partial method steps described herein.

Figure 8B:
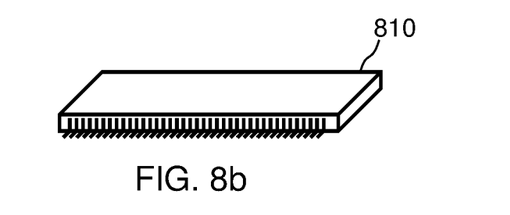
FIG. 8b illustrates a flash random access memory non-transitory computer readable media, according to an embodiment of the invention.

Referring now to FIG. 8*b*, shown is a non-transitory computer readable random access memory (RAM) chip medium 810 that stores computer code that, if executed by a computer processor, would cause the computer processor to perform methods or partial method steps described herein.

Figure 9A:
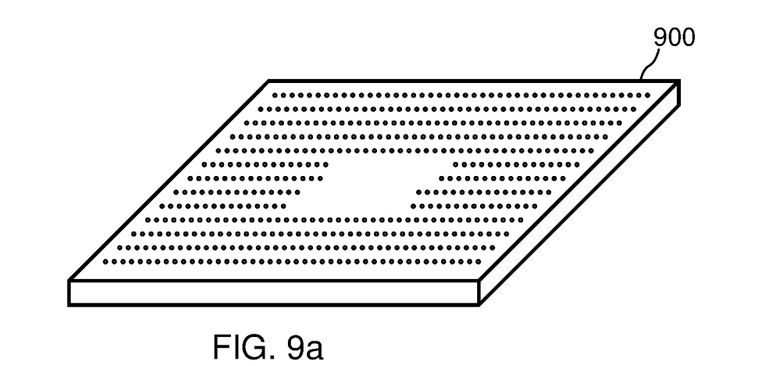
FIG. 9a illustrates the bottom side of a computer processor based system-on-chip, according to an embodiment of the invention.

Referring now to FIG. 9*a*, shown is the bottom (solder ball) side of a packaged system-on-chip (SoC) 900, which includes multiple computer processor cores having a component of some embodiments of the invention and that, by executing computer code, perform methods or partial method steps described herein.

Figure 9B:
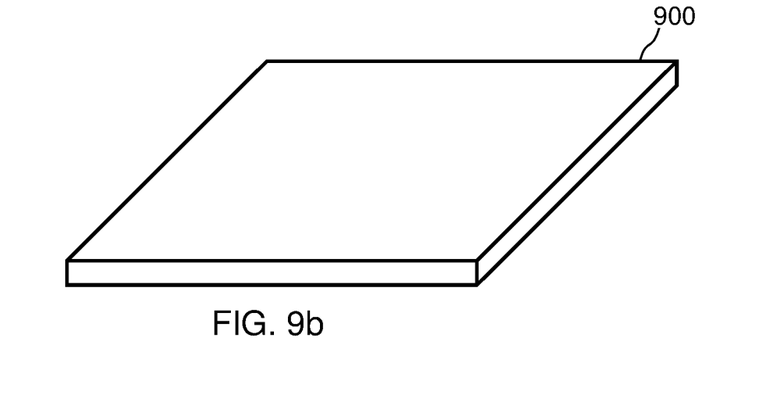
FIG. 9b illustrates the top side of a computer processor based system-on-chip, according to an embodiment of the invention.

Referring now to FIG. 9*b*, shown is the top side of the SoC 900.

The example of the one or more non-transitory computer readable media arranged to store such instructions for methods described herein. Whatever machine, which holds non-transitory computer readable media including any of the necessary code, may implement an example or an aspect of the invention. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Figure 10:
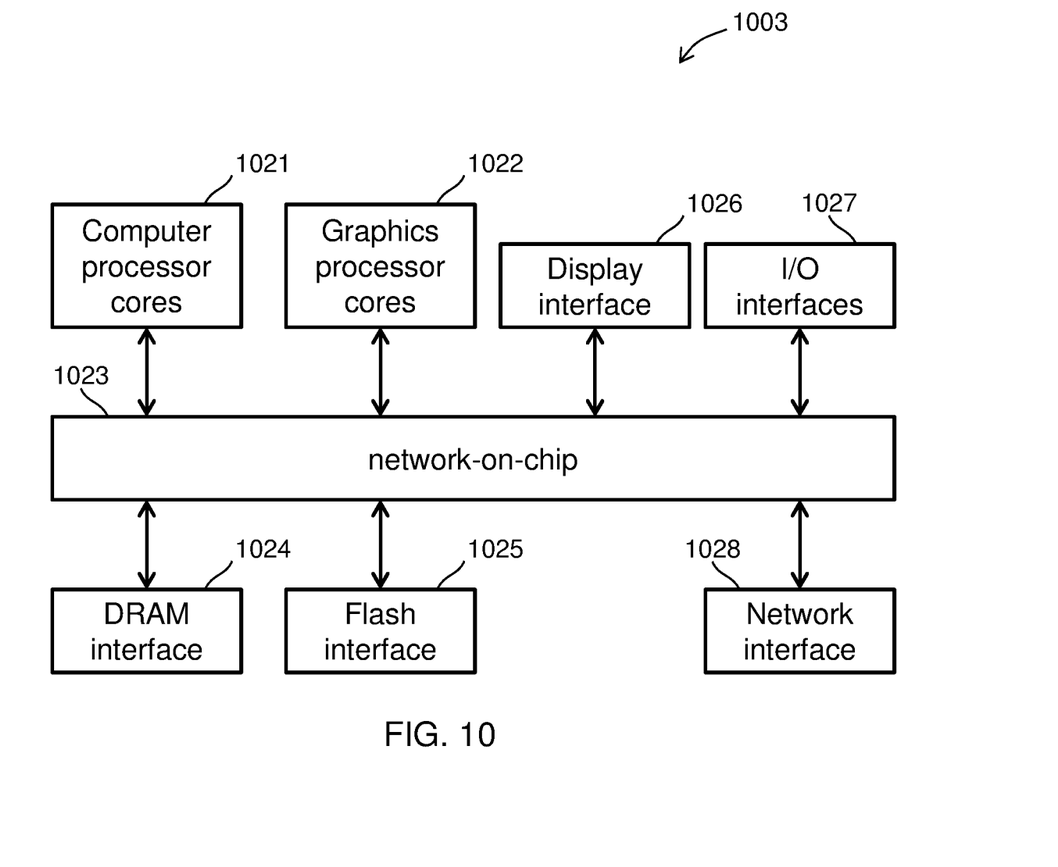
FIG. 10 shows a block diagram of a system-on-chip for devices, according to an embodiment of the invention.

Referring now to FIG. 10, a block diagram of the cores within the system-on-chip 1003 is shown. The system 1003 includes a multi-core computer processor (CPU) 1021 and a multi-core graphics accelerator processor (GPU) 1022. The CPU 1021 and GPU 1022 are connected through a network-on-chip (NoC) 1023 to a DRAM interface unit 1024 and a Flash RAM interface unit 1025. A display interface unit 1026 controls a display, enabling the system 1003 to output MPEG video and JPEG still image message content. An I/O interface unit 1027 provides for speaker and microphone access for the human-machine interface of a device controlled by SoC 1003. A network interface unit 1028 provides access for the system 1003 to communicate with remote locations (such as servers) over the internet or a wireless network or a local area network.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for interface protection, the method comprising:
    selecting a hardware description of an electronic design generated by using at least a hardware description generator, electronic design parameters, and interface protection implementation parameters;
    selecting an evaluation parameter; and
    comparing the hardware description to the evaluation parameter.

2. The method of claim 1, further comprising changing the hardware design based on the comparing step to generate a changed hardware design.

3. The method of claim 2, further comprising comparing the changed hardware design to the evaluation parameter.

4. The method of claim 1, wherein the evaluation parameter includes a state of timing closure.

5. The method of claim 1, wherein the evaluation parameter includes an area needed for a circuit or power consumed by the circuit.

6. The method of claim 1, wherein comparing the hardware description to the evaluation parameter includes evaluating the hardware description by a synthesis tool.

7. The method of claim 6, further comprising evaluating the hardware description by a place and route tool.

8. The method of claim 1, wherein the hardware description is used to register transfer logic (RTL) code.

9. The method of claim 8, further comprising concluding that the changed hardware design met the evaluation parameter.

10. The method of claim 1, further comprising concluding that the hardware design met the evaluation parameter.

11. A method for interface protection, the method comprising:
    generating electronic design parameters that define an electronic design;
    selecting an interface protection scheme;
    selecting a set of interface protection parameters according to the interface protection scheme wherein at least one parameter of the set of interface protection parameters is selected from a group include: an error-correcting code, a cyclic redundancy check, and a parity protection scheme;
    sending the electronic design parameters to a hardware description generation module;
    sending the set of interface protection parameters to the hardware description generation module; and
    receiving a hardware description generated by the hardware description generation module based on using the electronic design parameters and the set of interface protection parameters, wherein the hardware description meets an evaluation parameter.

12. The method of claim 11 wherein selecting an interface protection scheme includes determining one or more signals to be protected in forward direction and backward direction, a type of protection to be implemented, and one or more interfaces to be protected.

* * * * *